(12) United States Patent
Mizuguchi et al.

(10) Patent No.: US 11,597,372 B2
(45) Date of Patent: Mar. 7, 2023

(54) VEHICLE VIBRATION CONTROL DEVICE

(71) Applicant: AISIN CORPORATION, Kariya (JP)

(72) Inventors: Hirotaka Mizuguchi, Kariya (JP); Satoshi Kokubo, Kariya (JP); Yosuke Terada, Kariya (JP)

(73) Assignee: AISIN CORPORATION, Aichi (JP)

( * ) Notice: Subject to any disclaimer, the term of this patent is extended or adjusted under 35 U.S.C. 154(b) by 174 days.

(21) Appl. No.: 17/199,529

(22) Filed: Mar. 12, 2021

(65) Prior Publication Data

US 2021/0309206 A1   Oct. 7, 2021

(30) Foreign Application Priority Data

Apr. 1, 2020   (JP) .............................. JP2020-065958

(51) Int. Cl.
*B60W 20/00* (2016.01)
*B60L 15/20* (2006.01)

(52) U.S. Cl.
CPC .............. *B60W 20/00* (2013.01); *B60L 15/20* (2013.01); *B60L 2240/42* (2013.01); *B60L 2240/44* (2013.01); *B60L 2270/145* (2013.01); *B60W 2510/0685* (2013.01); *B60W 2510/08* (2013.01); *B60W 2710/083* (2013.01)

(58) Field of Classification Search
CPC ......... B60W 20/00; B60W 2510/0685; B60W 2510/08; B60W 2710/083; B60W 10/08; B60W 2030/206; B60W 2050/0042; B60W 30/20; B60L 15/20; B60L 2240/42; B60L 2240/44; B60L 2270/145
See application file for complete search history.

(56) References Cited

U.S. PATENT DOCUMENTS

| 2020/0049229 A1 | 2/2020 | Mizuguchi et al. |
| 2021/0163012 A1* | 6/2021 | Ko ........................ B60W 30/20 |
| 2022/0017061 A1* | 1/2022 | Mizuguchi .............. B60L 50/16 |
| 2022/0220912 A1* | 7/2022 | Suzuki ................ F02D 41/0097 |

FOREIGN PATENT DOCUMENTS

| JP | 2012071792 A | 4/2012 |
| JP | 2017100580 A | 6/2017 |
| JP | 2018095169 A | 6/2018 |
| JP | 2020026237 A | 2/2020 |

* cited by examiner

*Primary Examiner* — Roger L Pang
(74) *Attorney, Agent, or Firm* — Buchanan Ingersoll & Rooney PC

(57) ABSTRACT

A vehicle vibration control device includes: a motor generator connected via a motor shaft to a power transmission path between a crankshaft of an engine and a drive axle that transmits a drive torque to a tire; and a motor generator control portion executing control of an output torque which is actually output by the motor generator. The motor generator control portion includes a damper torque calculation section that acquires information on a crank angle and a motor angle to calculate a damper torque generated by a damper, an explosion cycle calculation section, a reverse phase torque calculation section, a delay time calculation section, a compensation time calculation section, a first compensation time calculation section, a torque correction amount calculation section, and a command output section.

5 Claims, 5 Drawing Sheets

VEHICLE VIBRATION CONTROL DEVICE

CROSS REFERENCE TO RELATED APPLICATIONS

This application is based on and claims priority under 35 U.S.C. § 119 to Japanese Patent Application 2020-065958, filed on Apr. 1, 2020, the entire content of which is incorporated herein by reference.

TECHNICAL FIELD

The technology disclosed in this application relates to a vehicle vibration control device.

BACKGROUND DISCUSSION

In the related art, as disclosed in JP 2012-71792A (Reference 1), JP 2018-95169A (Reference 2), and JP 2020-26237A (Reference 3), a technique is known in which, in a vehicle provided with an engine and a motor generator as a power source, a damper is provided in order to reduce vibration transmitted to a crankshaft of the engine, a motor torque having a reverse phase to that of a damper torque generated by the damper is output from the motor generator, and accordingly, vibration caused by the damper torque is reduced.

In the techniques disclosed in Reference 1 to Reference 3, a compensation time that takes into account the delay time is calculated after calculating the delay time based on various causes, and the phase is adjusted for the time corresponding to the compensation time when outputting the motor torque having the reverse phase such that the cycle of the damper torque and the cycle of the motor torque having the reverse phase match each other.

However, since this phase adjustment is executed by a control device such as an electronic control unit (ECU) that controls the motor generator, the control cycle of the control device also needs to be taken into consideration, but the techniques disclosed in Reference 1 to Reference 3 do not take this control cycle into consideration. Therefore, in a case where the time for phase adjustment and the timing of the control cycle do not match each other, the shift between the cycle of the damper torque and the cycle of the motor torque having the reverse phase remains, and as a result, there is a problem that the vibration caused by the damper torque is not reduced efficiently.

A need thus exists for a vehicle vibration control device which is not susceptible to the drawback mentioned above.

SUMMARY

A vehicle vibration control device according to an aspect of this disclosure includes: a motor generator that is connected via a motor shaft to a power transmission path between a crankshaft of an engine and a drive axle that transmits a drive torque to a tire; and a motor generator control portion that executes control of an output torque which is actually output by the motor generator, in which the motor generator control portion includes a damper torque calculation section that acquires information on a crank angle as a rotation angle of the crankshaft and a motor angle as a rotation angle of the motor shaft to calculate a damper torque generated by a damper which is provided on the power transmission path and reduces vibration transmitted to the crankshaft, based on a difference between the crank angle and the motor angle, an explosion cycle calculation section that calculates an explosion cycle of the engine based on the crank angle, a reverse phase torque calculation section that calculates a reverse phase torque having a phase reverse to the damper torque based on the damper torque, a delay time calculation section that calculates a delay time generated after a predetermined command to impart the output torque to the motor generator is output until the motor generator actually outputs the output torque in accordance with the predetermined command, a compensation time calculation section that calculates a compensation time for adjusting a timing of outputting the output torque in order to compensate the delay time based on the explosion cycle and the delay time, a first compensation time calculation section that calculates a first compensation time corresponding to an integral multiple excluding 0 of a preset control cycle time in the compensation time when a fractional time at which the compensation time is not an integral multiple of the control cycle time is generated, with reference to the compensation time and the control cycle time of the motor generator control portion, a torque correction amount calculation section that calculates a torque correction amount with respect to a first torque value based on a second compensation time obtained by subtracting the first compensation time from the compensation time, the first torque value at a point in time going back by the first compensation time in the reverse phase torque, and a second torque value in the reverse phase torque at a predetermined point in time going back by an integral multiple of the control cycle time beyond the compensation time, when the fractional time is generated, and a command output section that outputs a motor torque command given to the motor generator based on the reverse phase torque of which a phase is corrected by first phase correction based on the first compensation time and second phase correction that applies the torque correction amount to the first torque value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
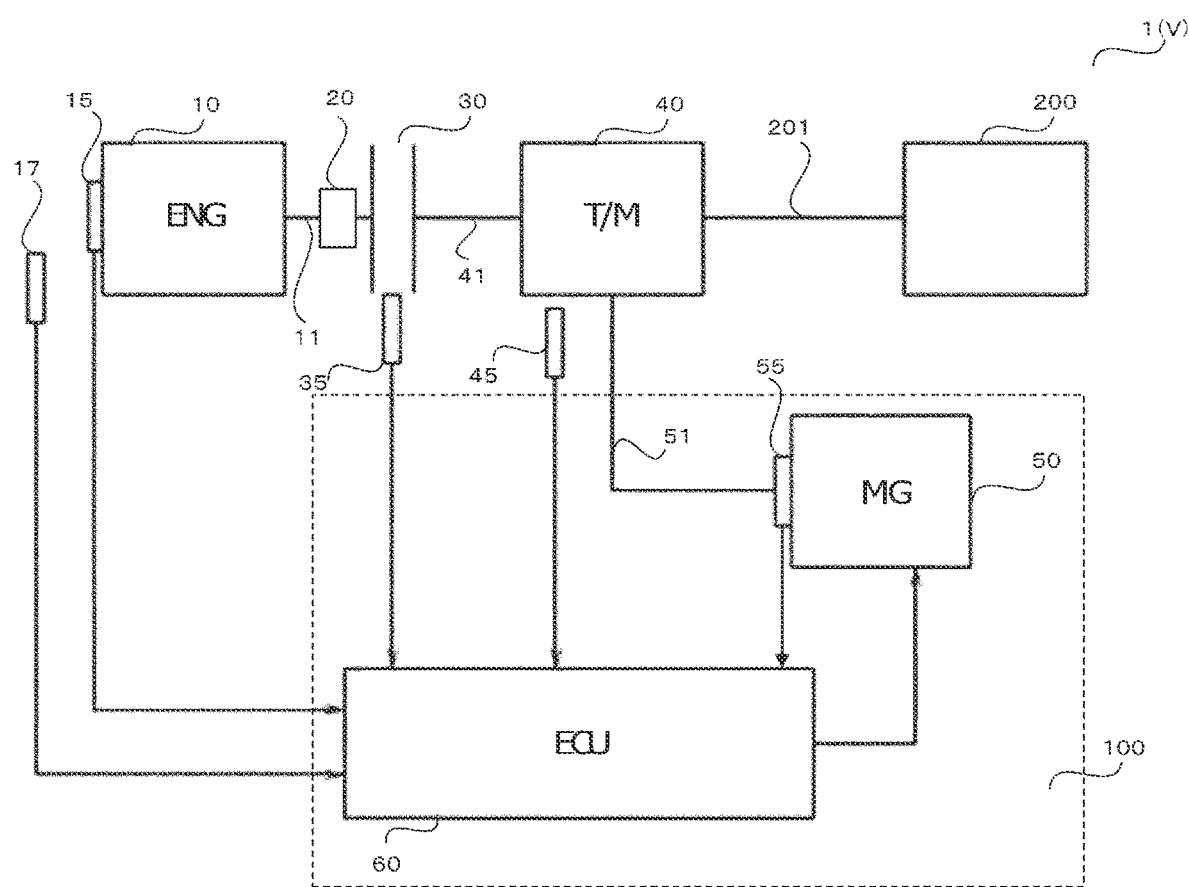
FIG. 1 is a schematic view schematically illustrating a configuration of a drive system of a vehicle including a vehicle vibration control device according to an embodiment.

Hereinafter, various embodiments will be described with reference to the attached drawings. The common configuration requirements in the drawings will be given the same reference numerals. It should also be noted that the configuration elements represented in a certain drawing may be omitted in another drawing for convenience of description. Furthermore, it should be noted that the attached drawings are not always drawn to the correct scale.

1. Configuration of Drive System Including Vehicle Vibration Control Device

An outline of the overall configuration of the vehicle vibration control device according to an embodiment will be described with reference to FIG. 1. FIG. 1 is a schematic view schematically illustrating a configuration of a drive system 1 including a vehicle vibration control device 100 according to the embodiment.

As illustrated in FIG. 1, the drive system 1 according to the embodiment mainly includes an engine 10, a damper 20, a clutch 30, a transmission 40, and a motor generator 50.

The engine 10 and the motor generator 50 are power sources for a vehicle V. The engine 10 outputs an engine torque according to the control of an engine ECU (not illustrated) to rotate a crankshaft 11. Similarly, the motor generator 50 outputs the motor torque according to the control of the motor generator control portion 60 to rotate a motor shaft 51.

The transmission 40 transmits at least one of the engine torque transmitted to the crankshaft 11 of the engine 10 and the motor torque transmitted to the motor shaft 51 of the motor generator 50 via a drive axle 201 at a predetermined gear ratio to a wheel 200. The motor shaft 51 is connected to a power transmission path between the crankshaft 11 and the drive axle 201.

The damper 20 is provided to reduce (absorb) the vibration transmitted to the crankshaft 11 due to the fluctuation of the engine torque. Similar to a general damper, the damper 20 is mainly configured with an elastic member and a friction material, and generates a damper torque including a torsion torque and a hysteresis torque according to the fluctuation of the engine torque.

The clutch 30 is provided between the engine 10 and the transmission 40, and switches the connection or disconnection between the crankshaft 11 of the engine 10 and an input shaft 41 of the transmission 40. In a case where the clutch 30 is in a connected state for connecting the crankshaft 11 and the input shaft 41 to each other, a part or all of the engine torque transmitted to the crankshaft 11 is transmitted to the input shaft 41 according to the degree of connection of the clutch 30. On the other hand, in a case of a disconnected state where the crankshaft 11 and the input shaft 41 are disconnected from each other, the engine torque transmitted to the crankshaft 11 is literally disconnected from being transmitted to the input shaft 41.

2. Configuration of Vehicle Vibration Control Device

Next, the details of the vehicle vibration control device 100 included in the drive system 1 will be described with reference to FIG. 1.

The vehicle vibration control device 100 according to the embodiment is mainly configured with the motor generator 50 and the motor generator control portion 60. The motor generator 50 is connected to a power transmission path between the crankshaft 11 and the drive axle 201 via the motor shaft 51.

As the motor generator 50, a general motor generator mainly configured with a stator and a rotor can be used.

The motor generator control portion 60 can be regarded as an ECU configured as a microcomputer including a processor, a memory, or the like, for example. The motor generator control portion 60 controls the motor generator 50 by outputting a motor torque command to the motor generator 50.

The motor generator control portion 60 can receive various information from various sensors provided in the vehicle V, for example, via a controller area network (CAN) communication. Specifically, as illustrated in FIG. 1, examples of the various sensors include a crank angle sensor 15, an accelerator position sensor 17, a clutch position sensor 35, a shift position sensor 45, and a motor angle sensor 55.

The accelerator position sensor 17 detects the information on the acceleration operation performed by the driver of the vehicle V, for example, by detecting an operation amount (or operating position) of an accelerator pedal provided to accelerate the vehicle V.

The clutch position sensor 35 detects information regarding the clutch 30 is in the connected state (or the degree of connection) or disconnected state by detecting the operation amount (or the operating position) of an actuator or the like for operating the clutch 30.

3. Control Executed by Motor Generator Control Portion 60

Figure 2:
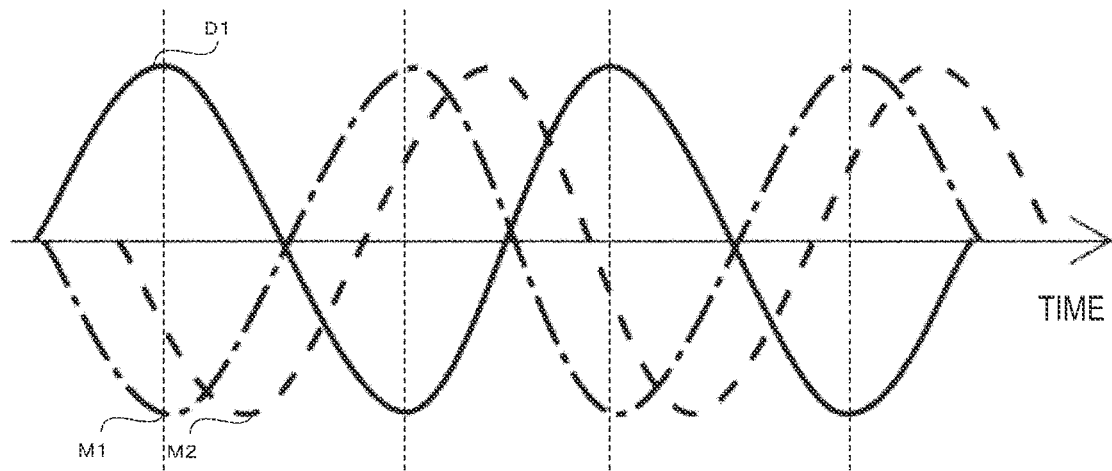
FIG. 2 is a view schematically illustrating a damper torque, an ideal reverse phase torque having a reverse phase to the damper torque, and a reverse phase torque in which a phase shift occurs with respect to the damper torque.
Figure 3:
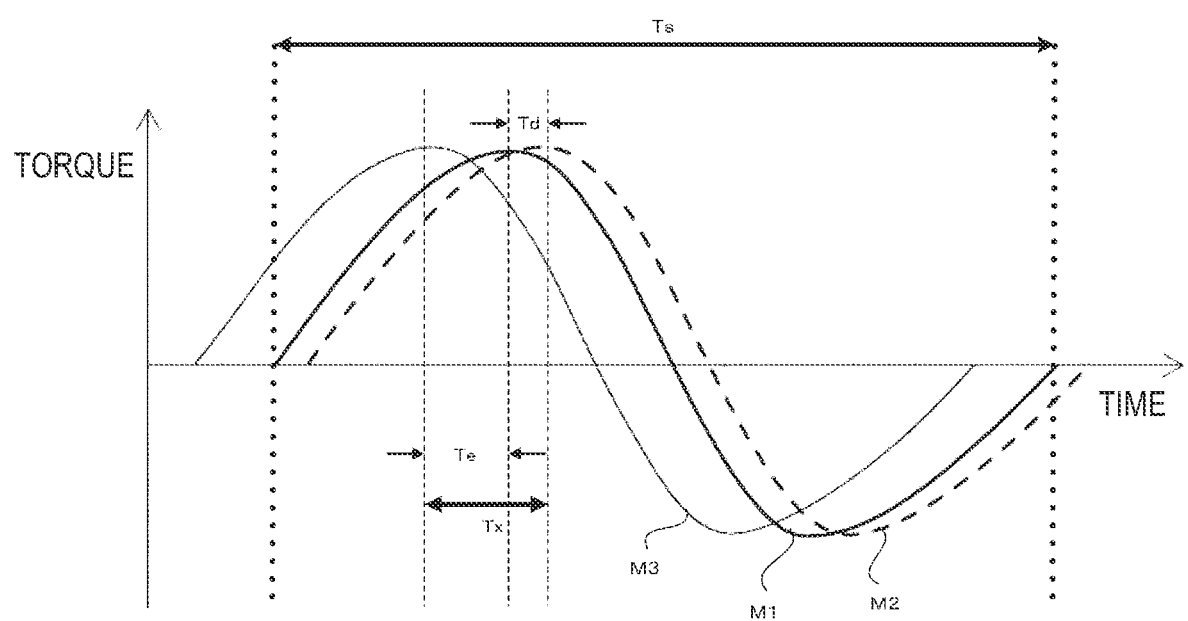
FIG. 3 is a view schematically illustrating the reverse phase torque before phase correction, a reverse phase torque of which a phase is corrected based on a control cycle, and the ideal reverse phase torque after phase correction.
Figure 4:
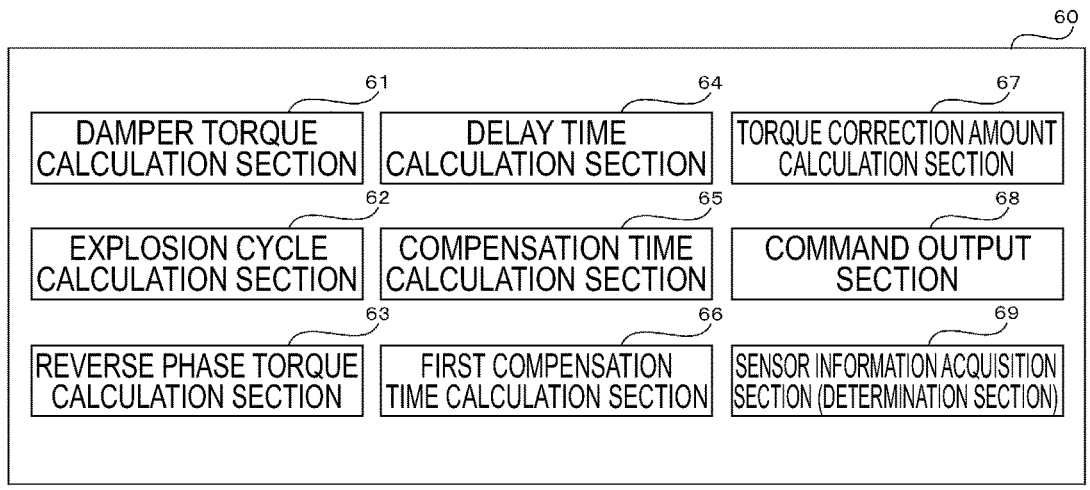
FIG. 4 is a block diagram schematically illustrating an example of a function of a motor generator control portion illustrated in FIG. 1.
Figure 5:
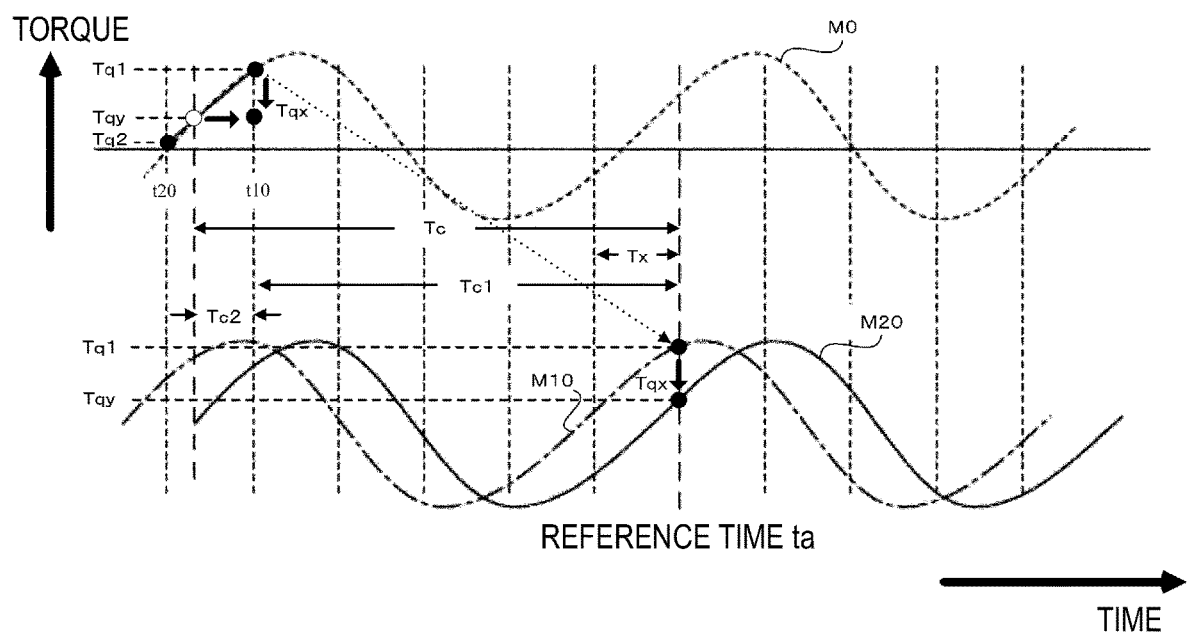
FIG. 5 is a view schematically illustrating calculation of a torque correction amount executed by a torque correction amount calculation section, and first phase correction and second phase correction with respect to the reverse phase torque executed by a command output section.

Next, the details of the control executed by the motor generator control portion 60 will be described with reference to FIGS. 2 to 5. FIG. 2 is a view schematically illustrating a damper torque L1, an ideal reverse phase torque M1 having a reverse phase to the damper torque, and a reverse phase torque M2 in which a phase shift occurs with respect to the damper torque. FIG. 3 is a view schematically illustrating the reverse phase torque M2 (which is the same as M2 in FIG. 2) before phase correction, a reverse phase torque M3 of which the phase is corrected based on a control cycle, and the ideal reverse phase torque M1 (which is the same as M1 in FIG. 2) after phase correction. FIG. 4 is a block diagram schematically illustrating an example of a function of the motor generator control portion 60 illustrated in FIG. 1. FIG. 5 is a view schematically illustrating calculation of a torque correction amount Tqx executed by a torque correction amount calculation section 67, and first phase correction and second phase correction with respect to the reverse phase torque executed by a command output section 68.

First, in a case where the time change of the damper torque based on the damper 20 is as illustrated by a solid line D1 illustrated in FIG. 2, in order to cancel the damper torque, it is required that the motor generator 50 outputs the motor torque which is the ideal reverse phase torque having a reverse phase in the solid line D1, similar to one-dot chain line M1 illustrated in FIG. 2. By doing so, it is possible to efficiently reduce the vibration caused by the damper torque generated according to the fluctuation of the engine torque.

However, when the above-described ideal reverse phase torque is output from the motor generator by the control by the motor generator control portion 60, a delay (details of the delay will be described later) due to various factors occurs, and the reverse phase torque of which the phase is shifted as illustrated by the dotted line M2 illustrated in FIG. 2 is actually output from the motor generator 50. In such a case, the time change D1 of the damper torque is not completely canceled by the time change M2 of the reverse phase torque that is actually output, and the vibration caused by the damper torque remains, and the remaining vibration also propagates to the drive axle. Therefore, in order to improve such a situation, that is, to completely cancel the damper torque, it is necessary for the motor generator control portion 60 to instruct the motor generator 50 to output the reverse phase torque (motor torque) of which the phase is adjusted, considering the delay based on the above-described various factors.

Furthermore, for example, a case where a shift by a delay time Td seconds occurs as illustrated in FIG. 3 between the ideal reverse phase torque (motor torque that matches the cycle of the damper torque) M1 and the reverse phase torque M2 of which the phase is shifted due to the delay, which are illustrated in FIG. 2, is assumed. In this case, it is necessary for the motor generator control portion 60 to instruct the motor generator 50 to output the reverse phase torque in accordance with a separately calculated explosion cycle Ts of the engine (the cycle of the reverse phase torque matches the explosion cycle Ts). Therefore, the motor generator control portion 60 may be delayed by the compensation time obtained by "explosion cycle Ts−delay time Td" such that the explosion cycle Ts and the cycle having the reverse phase torque match each other, and give the command to output the reverse phase torque to the motor generator 50. However, in the motor generator control portion 60, a control cycle time Tx unique to the device exists, and thus, even when it is set to be delayed by the compensation time related to "explosion cycle Ts−delay time Td" as described above, actually, only the time calculated from "explosion cycle Ts−control cycle time Tx×A (A is any integer excluding 0)" can be delayed.

In other words, in a case where the "delay time Td" and the "control cycle time Tx×A" are the same (Td is a multiple of Tx), no problem occurs, but in a case where both are not the same, even when it is set to give a command to the motor generator 50 by delaying by the above-described compensation time for the motor generator control portion 60, the command is actually delayed by "explosion cycle Ts−control cycle time Tx×A", which is different from the compensation time. As a result, as illustrated in FIG. 3, the reverse phase torque M2 of which the phase is shifted is not corrected to the ideal reverse phase torque M1, and the reverse phase torque M3 shifted by Te seconds from the ideal reverse phase torque is generated. In this case, the time change D1 of the damper torque is not completely canceled by the time change M3 of the reverse phase torque that is actually output, and the vibration caused by the damper torque remains, and the remaining vibration also propagates to the drive axle. Therefore, in order to completely cancel the damper torque (in order to generate the ideal reverse phase torque M1), it is necessary for the motor generator control portion 60 to instruct the motor generator 50 to output the reverse phase torque (motor torque) of which the phase is adjusted considering not only the delay based on the above-described various factors but also the control cycle of the motor generator control portion 60.

The motor generator control portion 60 in the vehicle vibration control device 100 according to the embodiment causes a processor to execute a predetermined program stored in a memory or the like, and makes each functional group illustrated in FIG. 4 function, and accordingly, it is set to issue a command to impart the reverse phase torque M2 as illustrated in FIGS. 2 and 3 to the motor generator 50.

In other words, as illustrated in FIG. 4, the motor generator control portion 60 mainly includes a damper torque calculation section 61, an explosion cycle calculation section 62, a reverse phase torque calculation section 63, a delay time calculation section 64, a compensation time calculation section 65, a first compensation time calculation section 66, a torque correction amount calculation section 67, and a command output section 68. The motor generator control portion 60 further includes a sensor information acquisition section 69 that receives various information from the above-described various sensors. These functional groups are stored in one or a plurality of dedicated hardware, and all the functional groups are provided so as to be able to communicate with each other.

3-1. Sensor Information Acquisition Section 69

The sensor information acquisition section 69 receives various information from the crank angle sensor 15, the accelerator position sensor 17, the clutch position sensor 35, the shift position sensor 45, the motor angle sensor 55 and the like, and sends these information to other functional sections. Furthermore, the sensor information acquisition section 69 also executes determination as to whether or not to output the reverse phase torque that should cancel the damper torque, based on the information received from the accelerator position sensor 17 and the clutch position sensor 35.

The determination as to whether or not to output the reverse phase torque that should cancel the damper torque may be appropriately set based on various information, but for example, in a case where the clutch 30 is in the disconnected state, or in a case where the acceleration operation is not performed even when the clutch 30 is in the connected state, the fluctuation of the engine torque is not transmitted on the power transmission path, and thus, it is not necessary to output the reverse phase torque. Therefore, in such a case, the sensor information acquisition section 69 notifies the command output section 68, which will be described later, that the reverse phase torque is not output. This determination may be set to be executed based on the information received from the above-described shift position sensor 45 (for example, the shift position is neutral), the information on the fuel cut, and the like.

3-2. Damper Torque Calculation Section 61

The damper torque calculation section 61 acquires information on a crank angle as the rotation angle of the crankshaft, and the information on a motor angle as the rotation angle of the motor shaft, from the crank angle sensor 15 and the motor angle sensor 55 via the sensor information acquisition section 69, and calculates the damper torque generated by the damper 20 based on the difference between the crank angle ($\theta 1$) and the motor angle ($\theta 2$). More specifically, the damper torque calculation section 61 calculates a damper torque Tdamp by multiplying the difference ($\theta 1 - \theta 2$) between the crank angle and the motor angle by a spring constant K of the elastic member that configures the damper 20 ("$\theta 1 - \theta 2$"×K).

Since the damper torque Tdamp calculated by the damper torque calculation section 61 also includes a driving component for driving the vehicle V, in one embodiment, in order to extract only the components that make the driver of the vehicle V feel unpleasant vibration, filtering processing is performed with respect to the damper torque Tdamp by a filtering processing section (not illustrated) provided separately.

The filtering processing section performs filtering processing using a band pass filter that allows a predetermined frequency component to pass through. In the embodiment, the filtering processing section extracts a filtered damper torque Tdamp-bpf by passing an explosion primary frequency fe of the engine 10 to the damper torque Tdamp. The explosion primary frequency fe of the engine 10 is calculated by the explosion cycle calculation section 62 described later together with the explosion cycle Ts of the engine 10.

3-3. Explosion Cycle Calculation Section 62

The explosion cycle calculation section 62 uses the following Equation (1) to compute the explosion primary frequency fe of the engine 10 from a rotation speed Ne (rpm) of the engine 10, which is calculated from the information on the crank angle, the number of cylinders n of the engine 10, and the number of cycles C. The information on the crank angle is received from the crank angle sensor 15 via the sensor information acquisition section 69, and the number of cylinders n and the number of cycles C are eigenvalues determined (stored) in advance by the vehicle V.

$$fe=(Ne \times n)/(60 \times C) \qquad (1)$$

The explosion cycle calculation section 62 uses the following Equation (2) to compute the explosion cycle Ts of the engine 10 based on the explosion primary frequency fe of the engine 10 computed by Equation (1).

$$Ts=1/fe \qquad (2)$$

3-4. Reverse Phase Torque Calculation Section 63

The reverse phase torque calculation section 63 calculates a reverse phase torque for canceling the filtered damper torque Tdamp-bpf based on the filtered damper torque Tdamp-bpf extracted by passing the explosion primary frequency fe of the engine 10 by the filtering processing section with respect to the damper torque Tdamp calculated by the damper torque calculation section 61. Specifically, the reverse phase torque can be calculated by the reverse processing of the sign (phase) of the filtered damper torque Tdamp-bpf.

3-5. Delay Time Calculation Section 64

The delay time calculation section 64 calculates all of the delay times (for example, a delay time T1 and a delay time T2 described later) generated until the motor generator 50 actually outputs the output torque in accordance with a predetermined command after the motor generator control portion 60 outputs the predetermined command to impart the output torque to the motor generator 50, and calculates the total delay time (the sum of the delay time T1 and the delay time T2), which is the sum of all these delay times.

Specifically, first, the delay time calculation section 64 calculates the first delay time T1 on the control response until the motor generator 50 outputs the output torque in accordance with the motor torque command after the motor torque command is output from the command output section 68 which will be described later. In the embodiment, the first delay time T1 in the control response can be the total time of a temperature delay time of the motor generator 50, a control operation delay time required for the output of the motor torque command executed by the motor generator control portion 60, and a communication delay time until the motor generator 50 receives the motor torque command, but the first delay time is not limited thereto, and the delay time based on other factors may further be considered. The above-described temperature delay time, control operation delay time, and communication delay time are calculated in advance using a method already known at the time of adapting work of the vehicle V, may be stored in the memory of the motor generator control portion 60, and further, various delay times may be obtained at an appropriate timing to update various delay times stored in the memory.

Secondly, the delay time calculation section 64 calculates the second delay time T2 based on the torque generated by the damper 20. The second delay time includes a delay time based on a hysteresis torque or a delay based on dynamic vibration absorption, depending on the structure of the damper 20. For example, in a case where the second delay time T2 is a delay time based on the hysteresis torque, the delay time based on this hysteresis torque can be calculated by using a method already known, but for example, is determined in advance for each vehicle V according to the engine speed Ne (rpm) of the engine 10, which is calculated based on the crank angle, an engine torque TQ (Nm) of the engine 10, and a shift stage of the transmission 40. Specifically, a map that calculates the entire delay time T2 based on the hysteresis torque corresponding to various combinations configured with the engine speed Ne (rpm) of the engine 10, which is calculated based on the crank angle, the engine torque TQ (Nm) of the engine 10, and the shift stage of the transmission 40, is prepared in advance, and the map is stored in the memory of the motor generator control portion 60. Therefore, the delay time calculation section 64 can calculate the delay time (second delay time T2) based on the hysteresis torque at any time based on this map.

In a case of calculating the delay time (second delay time T2) based on the hysteresis torque, the delay time calculation section 64 can also use another method already known. For example, the delay time may be calculated based on the hysteresis torque, based on a difference between a reference phase difference corresponding to the phase difference between the crank angle and the motor angle assumed in a case where the hysteresis torque is not generated, and an actual phase difference corresponding to the phase difference of the vibration component that corresponds to the explosion primary frequency fe of the engine 10 between the crank angle and the motor angle.

In this case, by the processing of the above-described filtering processing section, the actual phase difference can be calculated by extracting only the vibration component corresponding to the explosion primary frequency fe of the engine 10 from the crank angle as the detection result of the crank angle sensor 15 and the motor angle as the detection result of the motor angle sensor 55, respectively, and by comparing the extraction results.

The reference phase difference can be calculated based on the detection results of various sensors such as the accelerator position sensor 17 and the shift position sensor 45 and based on at least one or more maps created in advance. Since the details are disclosed in, for example, Reference 3 described above, the detailed description thereof will be omitted here.

3-6. Compensation Time Calculation Section 65

The compensation time calculation section 65 uses the following Equation (3) to calculate a compensation time Tc for adjusting the timing at which the motor generator 50 outputs the output torque in order to compensate for the total delay time based on the total delay time calculated as described above and the explosion cycle Ts of the engine 10.

$$Tc=Ts-(T1+T2) \qquad (3)$$

3-7. First Compensation Time Calculation Section 66

The first compensation time calculation section 66 calculates a first compensation time Tc1 corresponding to an integral multiple excluding 0 of the control cycle time Tx from the compensation time Tc with reference to the above-described compensation time Tc and the control cycle time Tx uniquely existing in the motor generator control portion 60 set in advance. Specifically, for example, in a case where the compensation time Tc is 10.0 (msec) and the control cycle time Tx is 3.0 (msec), the first compensation time Tc1 becomes 9.0 (msec) which is three times (integral multiple) the control cycle time of 3.0 (msec). In this case, the first compensation time Tc1 can also be set to 6.0 (msec), which is two times (integral multiple) the control cycle time of 3.0 (msec), but from the viewpoint of ensuring the accuracy of the torque correction amount which will be described later, it is preferable that the first compensation time Tc1 is a time shorter than the compensation time Tc, and is calculated by multiplying the control cycle time Tx by the largest integer (3 instead of 2 in the above-described example).

3-8. Torque Correction Amount Calculation Section 67

First, the torque correction amount calculation section 67 calculates a second compensation time Tc2 (Tc2=Tc−Tc1) obtained by subtracting the first compensation time Tc1 from the above-described compensation time Tc. Then, as illustrated in FIG. 5, the torque correction amount calculation section 67 calculates the torque correction amount Tqx with respect to the first torque value, based on the second compensation time Tc2, a first torque value Tq1 at a point in time t10 going back by the first compensation time in the reverse phase torque calculated by the reverse phase torque calculation section 63, and a second torque value Tq2 at a predetermined point in time t20 going back by an integral multiple of the control cycle time Tx beyond the compensation time Tc in the reverse phase torque calculated by the reverse phase torque calculation section 63.

The torque correction amount calculation section 67 calculates the above-described torque correction amount Tqx for the first time when a fractional time at which the compensation time Tc is not an integral multiple of the control cycle time Tx is generated. Conversely, in a case where the compensation time Tc is an integral multiple of the control cycle time Tx, for example, in a case where the compensation time Tc is 12.0 (msec) and the control cycle time Tx is 3.0 (msec) (compensation time Tc is four times the control cycle time Tx), "compensation time Tc=first compensation time Tc1" is satisfied and the second compensation time becomes 0. Therefore, the torque correction amount calculation section 67 does not need to calculate the torque correction amount Tqx (even when the torque correction amount Tqx is calculated, the torque correction amount Tqx is simply calculated as 0).

In other words, in a case where the compensation time Tc is an integral multiple of the control cycle time Tx, when the motor generator control portion 60 outputs the motor torque command given to the motor generator 50 via the command output section 68, which will be described later, based on the reverse phase torque obtained by correcting the phase by the compensation time Tc in the reverse phase torque calculated by the reverse phase torque calculation section 63, the motor generator 50 outputs the motor torque M2 which is the ideal reverse phase torque described with reference to FIGS. 2 and 3.

It can be said that the torque correction amount calculation section 67 has a function of supplementing the phase adjustment corresponding to the fractional time (second compensation time) of the compensation time Tc by correcting the torque value when the fractional time is generated.

Specifically, as illustrated in FIG. 5, the torque correction amount calculation section 67 refers to the first torque value Tq1 at the point in time t10 going back by the first compensation time Tc1 after the reference time ta that is set in any manner, on a reverse phase torque M0 calculated by the reverse phase torque calculation section 63. Next, the torque correction amount calculation section 67 refers to the second torque value Tq2 at a predetermined point in time t20 going back by time by an integral multiple of the control cycle time Tx beyond the compensation time Tc, on the reverse phase torque M0. As illustrated in FIG. 5, the first compensation time Tc1 corresponds to five times the control cycle time Tx (the point in time t10 is a point in time going back by time corresponding to five times the control cycle time Tx from the reference time ta, and 5 related to five times corresponds to the above-described largest integer), and the predetermined point in time t20 corresponds to a point in time that going back by time by 6 times the control cycle time Tx beyond the compensation time Tc.

Then, as illustrated in FIG. 5, the torque correction amount calculation section 67 can use the linear interpolation to calculate a torque correction value Tqy as the phase adjustment corresponding to the second compensation time, based on the straight line and the slope obtained by connecting the first torque value Tq1 and the second torque value Tq2, on the reverse phase torque M0. The torque correction amount calculation section 67 can simultaneously calculate the torque correction amount Tqx with respect to the first torque value Tq1 based on the torque correction value Tqy corresponding to the second correction time (in a case illustrated in FIG. 5, "Tqx=Tq1−Tqy"). When calculating the torque correction value Tqy and the torque correction amount Tqx described above, other approximation methods such as spline interpolation may be used instead of the linear interpolation.

3-9. Command Output Section 68

In a case where the sensor information acquisition section 69 determines that the reverse phase torque that should cancel the damper torque should be output, the command output section 68 outputs the motor torque command given to the motor generator 50 based on the reverse phase torque of which the phase is corrected by the first phase correction based on the first compensation time Tc1 calculated by the first compensation time calculation section 66 and the second phase correction in which the torque correction amount Tqx calculated by the torque correction amount calculation section 67 is applied to the first torque value Tq1 (the torque correction amount Tqx is subtracted from the first torque value Tq1).

The reverse phase torque obtained by performing the first phase correction with respect to the reverse phase torque M0 calculated by the reverse phase torque calculation section 63 is represented as a reverse phase torque M10 in FIG. 5. The reverse phase torque obtained by performing the second phase correction with respect to the reverse phase torque M10 is represented as a reverse phase torque M20 in FIG. 5.

In the second phase correction, instead of the method of applying the torque correction amount Tqx to the first torque value Tq1, a method of directly converting the first torque value Tq1 to the torque correction value Tqy may be adopted.

As described above, the motor generator control portion 60 according to the embodiment can output the motor torque which is the ideal reverse phase torque having the reverse phase of the damper torque from the motor generator 50, by performing the two-stepped phase correction including the above-described first phase correction and second phase correction in consideration of the control cycle time Tx of the motor generator control portion 60.

4. Process Up to Motor Torque Command Performed by Motor Generator Control Portion 60

Figure 6:
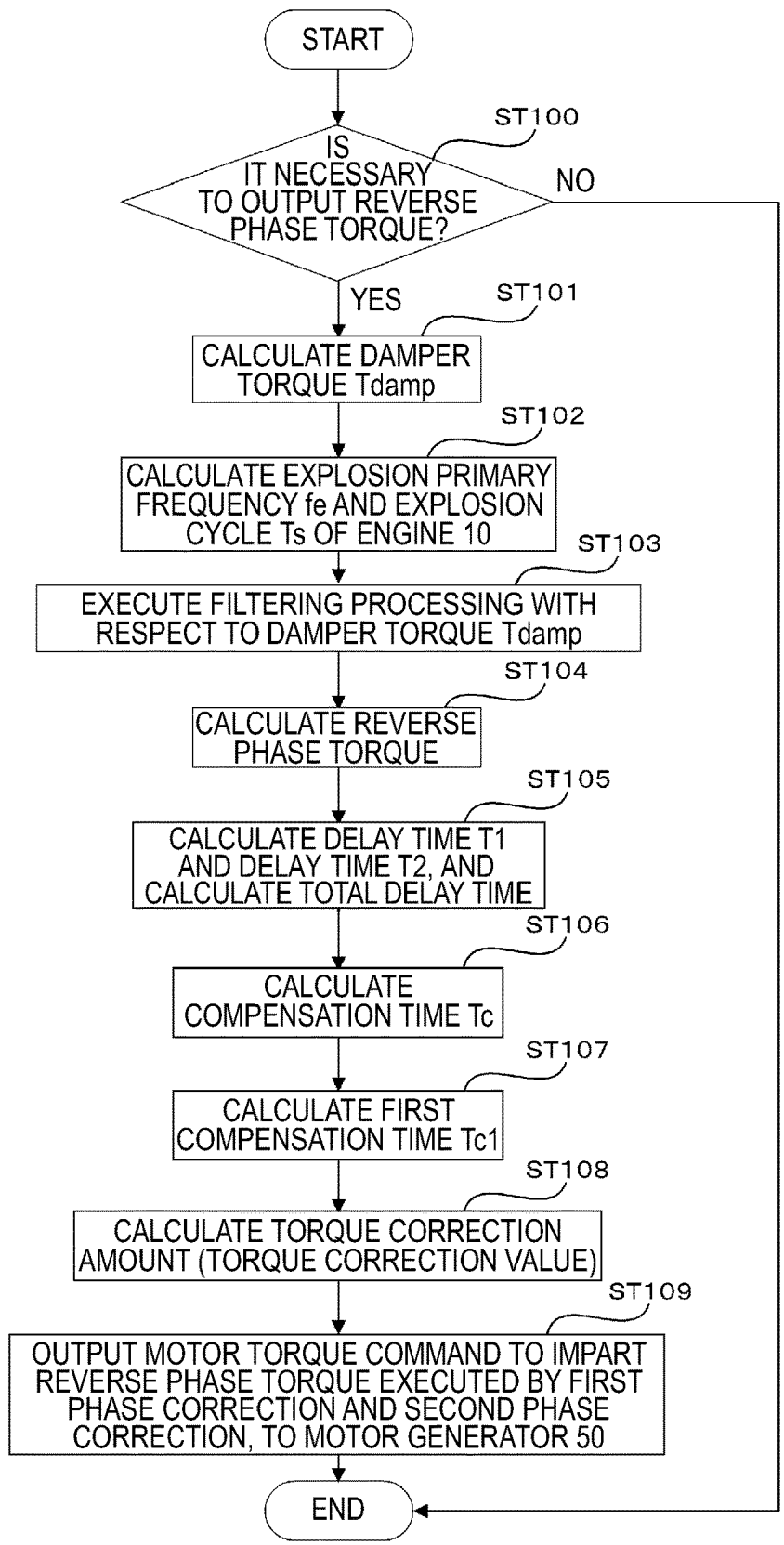
FIG. 6 is a flow chart illustrating a process performed in the motor generator control portion.
Figure 7:
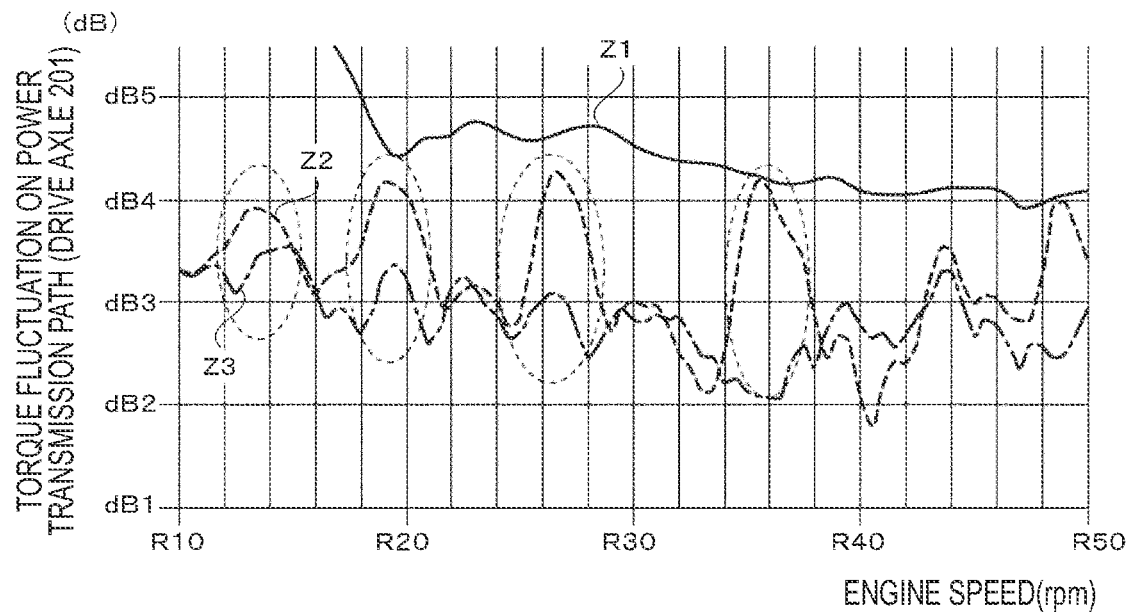
FIG. 7 is a view of simulation indicating that vibration caused by the damper torque is efficiently reduced in a vehicle including the vehicle vibration control device illustrated in FIG. 1.
Figure 8:
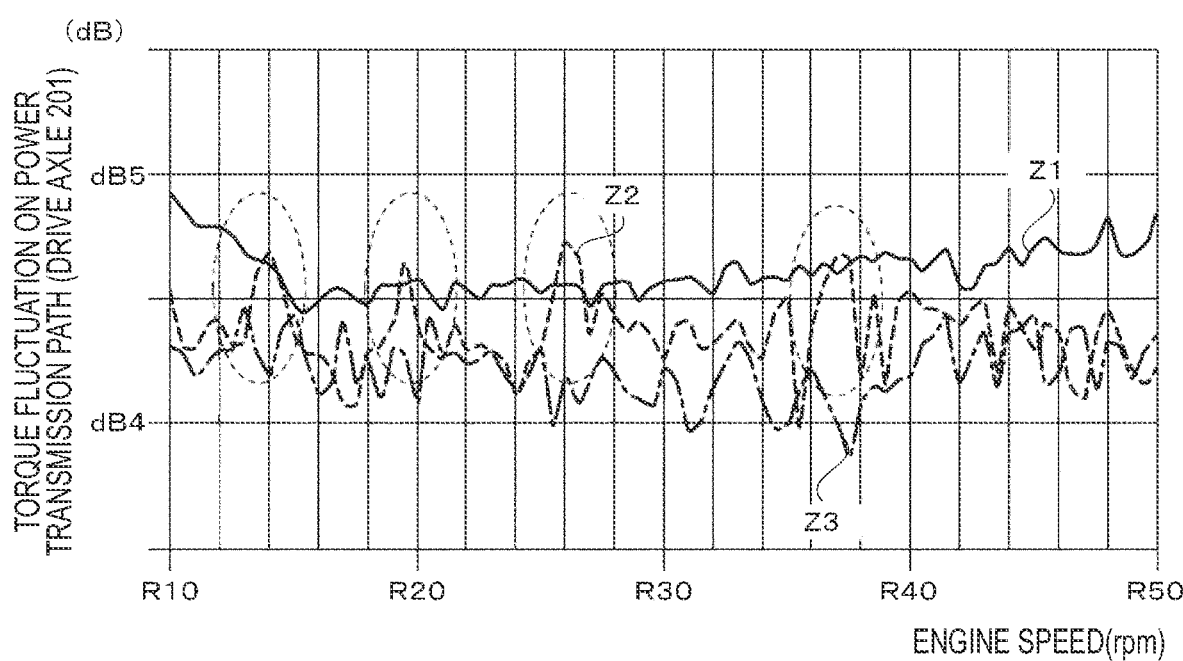
FIG. 8 is a view of evaluation result indicating that vibration caused by the damper torque is efficiently reduced in the vehicle including the vehicle vibration control device illustrated in FIG. 1.

Next, a detailed process (flow) up to the motor torque command performed by the motor generator control portion 60 according to the embodiment will be described with reference to FIGS. 6 to 8. FIG. 6 is a flow chart illustrating a process performed in the motor generator control portion 60. FIG. 7 is a view of simulation indicating that the vibration caused by the damper torque is efficiently reduced in the vehicle V including the vehicle vibration control device 100 illustrated in FIG. 1. FIG. 8 is a view of evaluation result indicating that the vibration caused by the damper torque is efficiently reduced in the vehicle V including the vehicle vibration control device 100 illustrated in FIG. 1.

First, in a step (hereinafter, referred to as "ST") 100, the sensor information acquisition section 69 executes determination as to whether or not to output the reverse phase torque that should cancel the damper torque, based on the information acquired from various sensors, for example, the information received from the accelerator position sensor 17 and the clutch position sensor 35.

When the sensor information acquisition section 69 determines that it is not necessary to output the reverse phase torque ("NO" in ST100), the process by the motor generator control portion 60 ends.

Meanwhile, when the sensor information acquisition section 69 determines that it is necessary to output the reverse phase torque ("YES" in ST100), the process shifts to ST101. In ST101, the damper torque calculation section 61 acquires information on a crank angle as the rotation angle of the crankshaft, and the information on a motor angle as the rotation angle of the motor shaft, from the crank angle sensor 15 and the motor angle sensor 55 via the sensor information acquisition section 69, and calculates the damper torque Tdamp generated by the damper 20 based on the difference between the crank angle ($\theta 1$) and the motor angle ($\theta 2$), as described above.

Next, the process shifts from ST101 to ST102. In ST102, the explosion cycle calculation section 62 calculates the explosion primary frequency fe of the engine 10 and the explosion cycle Ts of the engine 10 as described above. The order of ST101 and ST102 may be reversed.

Next, the process shifts from ST102 to ST103. In ST103, as described above, the filtering processing section extracts a filtered damper torque Tdamp-bpf by passing the explosion primary frequency fe of the engine 10 to the damper torque Tdamp, using the band pass filter.

Next, the process shifts from ST103 to ST104. In ST104, the reverse phase torque calculation section 63 calculates the reverse phase torque for canceling the filtered damper torque Tdamp-bpf based on the filtered damper torque Tdamp-bpf as described above.

Next, the process shifts from ST104 to ST105. In ST105, as described above, the delay time calculation section 64 calculates each delay time T2 based on the delay time T1 in the control response and the hysteresis torque, respectively, and then calculates the total delay time (the sum of the delay time T1 and the delay time T2). In a case where an additional delay time related to other factors is generated, the total delay time is calculated after adding up the additional delay time.

Next, the process shifts from ST105 to ST106. In ST106, the compensation time calculation section 65 calculates the compensation time Tc for adjusting the timing at which the motor generator 50 outputs the output torque in order to compensate for the total delay time based on the total delay time and the explosion cycle Ts of the engine 10.

Next, the process shifts from ST106 to ST107. In ST107, the first compensation time calculation section 66 calculates, as described above, the first compensation time Tc1 corresponding to an integral multiple excluding 0 of the control cycle time Tx from the compensation time Tc with reference to the compensation time Tc and the control cycle time Tx uniquely existing in the motor generator control portion 60 set in advance.

Next, the process shifts from ST107 to ST108. In St108, the torque correction amount calculation section 67 calculates the second compensation time Tc2 (Tc2=Tc−Tc1) by subtracting the first compensation time Tc1 from the compensation time Tc, and then calculates the torque correction amount Tqx (and the torque correction value Tqy) with respect to the first torque value, based on the second compensation time Tc2, the first torque value Tq1 at the point in time t10 going back by the first compensation time in the reverse phase torque calculated by the reverse phase torque calculation section 63, and the second torque value Tq2 at a predetermined point in time t20 going back by an integral multiple of the control cycle time Tx beyond the compensation time Tc in the reverse phase torque calculated by the reverse phase torque calculation section 63.

Next, the process shifts from ST108 to ST109. In ST109, the command output section 68 outputs the motor torque command given to the motor generator 50 based on the reverse phase torque of which the phase is corrected by the first phase correction based on the first compensation time Tc1 calculated by the first compensation time calculation section 66 and the second phase correction in which the torque correction amount Tqx calculated by the torque correction amount calculation section 67 is applied to the first torque value Tq1 (the torque correction amount Tqx is subtracted from the first torque value Tq1). Accordingly, the process by the motor generator control portion 60 is completed.

The motor generator 50, to which the motor torque command is output by the motor generator control portion 60 according to the embodiment based on the series of processes described above, can output the motor torque which is the ideal reverse phase torque having the reverse phase of the damper torque.

As a result, as illustrated in FIGS. 7 and 8, by the motor generator 50, to which the motor torque command is output by the motor generator control portion 60 according to the embodiment based on the series of processes described above, it is illustrated that the vibration caused by the damper torque is efficiently reduced both in the simulation and the evaluation result using the actual device. In FIGS. 7 and 8, the solid line indicated by Z1 is Comparative Example 1 in a case where the reverse phase torque is not generated, the dotted line indicated by Z2 is Comparative Example 2 in a case where the reverse phase torque is output from the motor generator 50 by the vehicle vibration control device of the related art in which the control cycle time Tx is not considered, and the one-dot chain line indicated by Z3 is Example in a case where the reverse phase torque is output from the motor generator 50 by the vehicle vibration control device 100 according to the embodiment.

As illustrated in FIGS. 7 and 8, in Comparative Example 1, the torque fluctuation (vibration) is a large value at any engine speed. In Comparative Example 2, although the torque fluctuation (vibration) is relaxed as a whole as compared with Comparative Example 1, the torque fluctuation (vibration) increases in the region (engine speed is approximately R12 to R14 rpm, approximately R18 to R20 rpm, approximately R26 to R28 rpm, and approximately R36 to R38 rpm) particularly surrounded by the dotted line in FIGS. 7 and 8. In FIGS. 7 and 8, R10<R20<R30<R40<R50, and dB1<dB2<dB3<dB4<dB5 are satisfied.

On the other hand, in Example, it can be seen that the torque fluctuation (vibration) is generally a small value at all engine speeds. In other words, the vehicle vibration control device 100 according to the embodiment can efficiently reduce the vibration caused by the damper torque.

A vehicle vibration control device according to an aspect of this disclosure includes: a motor generator that is connected via a motor shaft to a power transmission path between a crankshaft of an engine and a drive axle that transmits a drive torque to a tire; and a motor generator control portion that executes control of an output torque which is actually output by the motor generator, in which the motor generator control portion includes a damper torque calculation section that acquires information on a crank angle as a rotation angle of the crankshaft and a motor angle as a rotation angle of the motor shaft to calculate a damper torque generated by a damper which is provided on the power transmission path and reduces vibration transmitted to the crankshaft, based on a difference between the crank angle and the motor angle, an explosion cycle calculation section that calculates an explosion cycle of the engine based on the crank angle, a reverse phase torque calculation section that calculates a reverse phase torque having a phase reverse to the damper torque based on the damper torque, a delay time calculation section that calculates a delay time generated after a predetermined command to impart the output torque to the motor generator is output until the motor generator actually outputs the output torque in accordance with the predetermined command, a compensation time calculation section that calculates a compensation time for adjusting a timing of outputting the output torque in order to compensate the delay time based on the explosion cycle and the delay time, a first compensation time calculation section that calculates a first compensation time corresponding to an integral multiple excluding 0 of a preset control cycle time in the compensation time when a fractional time at which the compensation time is not an integral multiple of the control cycle time is generated, with reference to the compensation time and the control cycle time of the motor generator control portion, a torque correction amount calculation section that calculates a torque correction amount with respect to a first torque value based on a second compensation time obtained by subtracting the first compensation time from the compensation time, the first torque value at a point in time going back by the first compensation time in the reverse phase torque, and a second torque value in the reverse phase torque at a predetermined point in time going back by an integral multiple of the control cycle time beyond the compensation time, when the fractional time is generated, and a command output section that outputs a motor torque command given to the motor generator based on the reverse phase torque of which a phase is corrected by first phase correction based on the first compensation time and second phase correction that applies the torque correction amount to the first torque value.

Simply stated, the vehicle vibration control device having this configuration corrects the phase by converting the fractional time of the compensation time, which cannot be compensated for in the control cycle, that is, the second compensation time, into a form of the torque correction amount when the fractional time at which the compensation time is not an integral multiple of the control cycle time is generated. Accordingly, the vehicle vibration control device having this configuration also considers the control cycle, the cycle of the damper torque and the cycle of the reverse phase torque actually output by the motor generator match each other (no shift occurs), and accordingly, it is possible to efficiently reduce the vibration caused by the damper torque.

In the vehicle vibration control device according to the aspect, the first compensation time may be shorter than the compensation time and may be calculated by multiplying the control cycle time by a maximum integer.

With this configuration, by minimizing the second compensation time while maximizing the first compensation time of the compensation time, which can be compensated for in the control cycle, it is possible to ensure the accuracy of the torque correction amount. As a result, it is possible to ensure the consistency between the cycle of the damper torque and the cycle of the reverse phase torque actually output by the motor generator, and to more efficiently reduce the vibration caused by the damper torque.

In the vehicle vibration control device according to the aspect, the predetermined point in time may be a point in time going back by time which is calculated by multiplying the control cycle time by an integer obtained by adding 1 to the maximum integer.

With this configuration as well, it is possible to ensure the accuracy of the torque correction amount. As a result, it is possible to ensure the consistency between the cycle of the damper torque and the cycle of the reverse phase torque actually output by the motor generator, and to more efficiently reduce the vibration caused by the damper torque.

In the vehicle vibration control device according to the aspect, the torque correction amount may be calculated by linear interpolation based on a straight line and a slope obtained by connecting the first torque value at a point in time going back by the first compensation time in the reverse phase torque and the second torque value at the predetermined point in time.

With this configuration, it is possible to accurately and reliably calculate the torque correction amount.

In the vehicle vibration control device according to the aspect, the delay time may include a first delay in a control response from an output of the motor torque command from the command output section to an output of the output torque in response to the motor torque command by the motor generator, and a second delay based on a torque generated by the damper. The second delay includes a hysteresis torque, a delay due to dynamic vibration absorption, and the like, depending on the damper structure.

With this configuration, it is possible to grasp the delay time of the entire device and calculate an accurate compensation time, and as a result, it is possible to ensure consistency between the cycle of the damper torque and the cycle of the reverse phase torque actually output by the motor generator, and to more efficiently reduce the vibration caused by the damper torque.

According to various embodiments, a vehicle vibration control device capable of efficiently reducing vibration caused by the damper torque can be provided.

As described above, although various embodiments of the disclosure have been exemplified, the above-described embodiment is merely an example, and does not limit the range of disclosure. The above-described embodiment can be implemented in other various forms, and various omissions, substitutions, and modifications can be made without departing from the scope of the disclosure. Each configuration, shape, size, length, width, thickness, height, number, and the like can be appropriately changed for implementation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle vibration control device comprising:
a motor generator that is connected via a motor shaft to a power transmission path between a crankshaft of an engine and a drive axle that transmits a drive torque to a tire; and
a motor generator control portion that executes control of an output torque which is actually output by the motor generator, wherein
the motor generator control portion includes
a damper torque calculation section that acquires information on a crank angle as a rotation angle of the crankshaft and a motor angle as a rotation angle of the motor shaft to calculate a damper torque generated by a damper which is provided on the power transmission path and reduces vibration transmitted to the crankshaft, based on a difference between the crank angle and the motor angle,
an explosion cycle calculation section that calculates an explosion cycle of the engine based on the crank angle,
a reverse phase torque calculation section that calculates a reverse phase torque having a phase reverse to the damper torque based on the damper torque,
a delay time calculation section that calculates a delay time generated after a predetermined command to impart the output torque to the motor generator is output until the motor generator actually outputs the output torque in accordance with the predetermined command,
a compensation time calculation section that calculates a compensation time for adjusting a timing of outputting the output torque in order to compensate the delay time based on the explosion cycle and the delay time,
a first compensation time calculation section that calculates a first compensation time corresponding to an integral multiple excluding 0 of a preset control cycle time in the compensation time when a fractional time at which the compensation time is not an integral multiple of the control cycle time is generated, with reference to the compensation time and the control cycle time of the motor generator control portion,
a torque correction amount calculation section that calculates a torque correction amount with respect to a first torque value based on a second compensation time obtained by subtracting the first compensation time from the compensation time, the first torque value at a point in time going back by the first compensation time in the reverse phase torque, and a second torque value in the reverse phase torque at a predetermined point in time going back by an integral multiple of the control cycle time beyond the compensation time, when the fractional time is generated, and
a command output section that outputs a motor torque command given to the motor generator based on the reverse phase torque of which a phase is corrected by first phase correction based on the first compensation time and second phase correction that applies the torque correction amount to the first torque value.

2. The vehicle vibration control device according to claim 1, wherein
the first compensation time is shorter than the compensation time and is calculated by multiplying the control cycle time by a maximum integer.

3. The vehicle vibration control device according to claim 2, wherein
the predetermined point in time is a point in time going back by time which is calculated by multiplying the control cycle time by an integer obtained by adding 1 to the maximum integer.

4. The vehicle vibration control device according to claim 1, wherein
the torque correction amount is calculated by linear interpolation based on a straight line and a slope obtained by connecting the first torque value at a point in time going back by the first compensation time in the reverse phase torque and the second torque value at the predetermined point in time.

5. The vehicle vibration control device according to claim 1, wherein
the delay time includes a first delay in a control response from an output of the motor torque command from the command output section to an output of the output torque in response to the motor torque command by the motor generator, and a second delay based on a torque generated by the damper.

* * * * *